United States Patent [19]

Majkrzak et al.

[11] 4,290,654
[45] Sep. 22, 1981

[54] WHEEL RIM MOUNTING DEVICE FOR VARIABLE WHEEL SPACING

[75] Inventors: David S. Majkrzak, West Fargo; Dwight B. Hinkel, Fargo, both of N. Dak.

[73] Assignee: Steiger Tractor, Inc., Fargo, N. Dak.

[21] Appl. No.: 91,589

[22] Filed: Nov. 5, 1979

[51] Int. Cl.³ .......................................... B60B 23/12
[52] U.S. Cl. ............................ 301/9 TV; 301/13 SM; 301/11 S
[58] Field of Search ............. 301/9 TV, 13 R, 13 SM, 301/11 R, 11 S, 36 R, 38 R, 39 R, 39 T, 40 S, 128, 64 SD

[56] References Cited

U.S. PATENT DOCUMENTS

| | | |
|---|---|---|
| 1,802,773 | 4/1931 | Nelson . |
| 2,162,696 | 6/1939 | Burger . |
| 2,175,294 | 10/1939 | Jaeger . |
| 2,432,407 | 12/1947 | Ginkel . |
| 2,467,482 | 4/1949 | Hutchings ....................... 301/9 TV |
| 2,495,952 | 1/1950 | Allman . |
| 2,682,430 | 6/1954 | Brubaker ....................... 301/128 X |
| 2,727,789 | 12/1955 | Kanemoto . |
| 2,916,329 | 12/1959 | Gilbert ....................... 301/64 SD X |
| 3,048,443 | 8/1962 | O'Donnell et al. ............... 301/9 TV |
| 3,606,473 | 9/1971 | Lemmon . |

FOREIGN PATENT DOCUMENTS

| | | | |
|---|---|---|---|
| 496603 | 10/1953 | Canada ........................... 301/9 TV |
| 143876 | 3/1931 | Switzerland ...................... 301/9 TV |
| 563508 | 8/1944 | United Kingdom ............ 301/9 TV |
| 1494080 | 12/1977 | United Kingdom ............ 301/9 TV |

Primary Examiner—Charles A. Marmor
Attorney, Agent, or Firm—Kinney, Lange, Braddock, Westman and Fairbairn

[57] ABSTRACT

A wheel rim mounting device for variable wheel spacing in combination with a conventional wheel hub attached to an axle of a tractor includes a cylindrical sleeve with an inner flange attached to the flange of the wheel hub. A plurality of circumferentially spaced rigid bars are rigidly attached to the outer surface of the cylindrical sleeve with the bars having a plurality of outwardly facing threaded apertures. Circumferentially spaced U-shaped brackets are rigidly attached to the inner surface of a wheel rim and slidably engage the bars attached to the cylindrical sleeve. The U-shaped brackets include a plurality of apertures, two of which are alignable with two of the threaded apertures of the bar. Cap screws engage the apertures of the U-shaped bracket and the threaded apertures of the bar securing the wheel rim to the cylindrical sleeve. When the cap screws are disengaged, the U-shaped brackets are spaced from the bars allowing the wheel rim to be freely slid along the bars for removal or adjustment in the axial direction.

12 Claims, 5 Drawing Figures

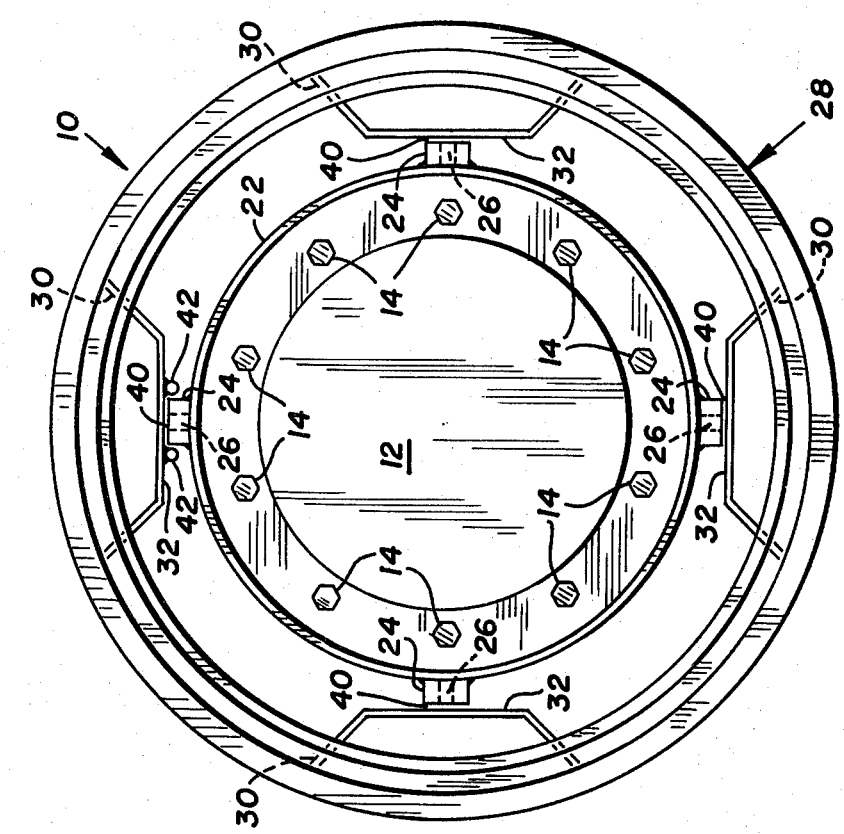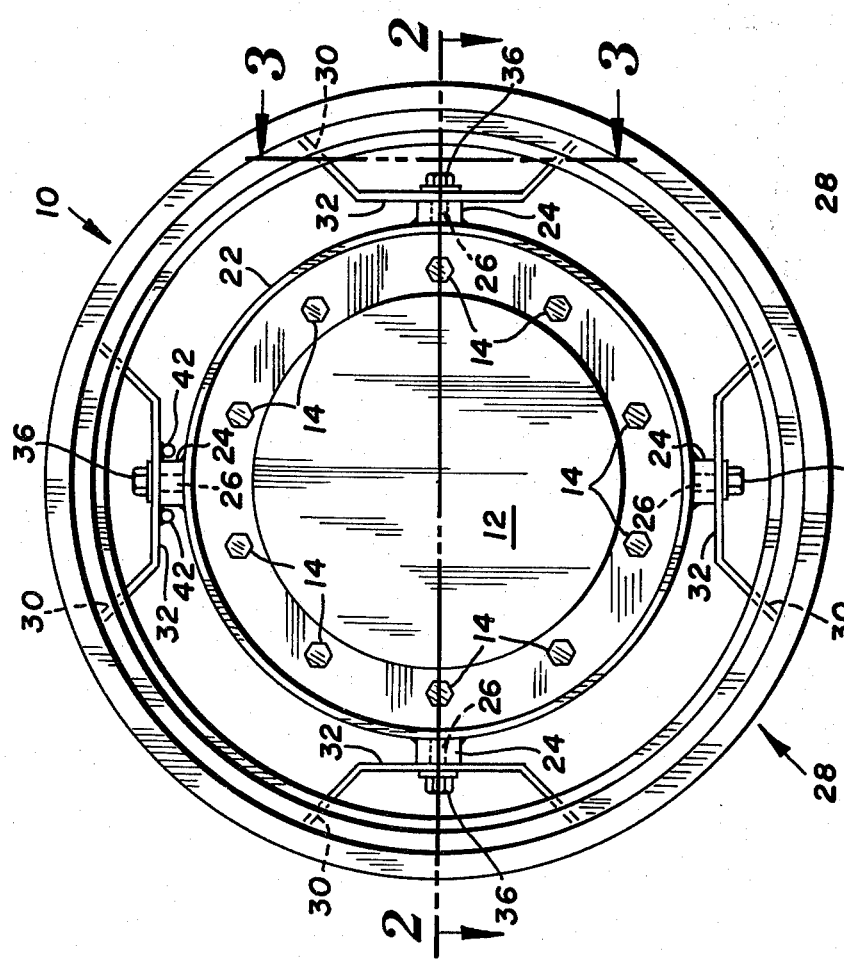

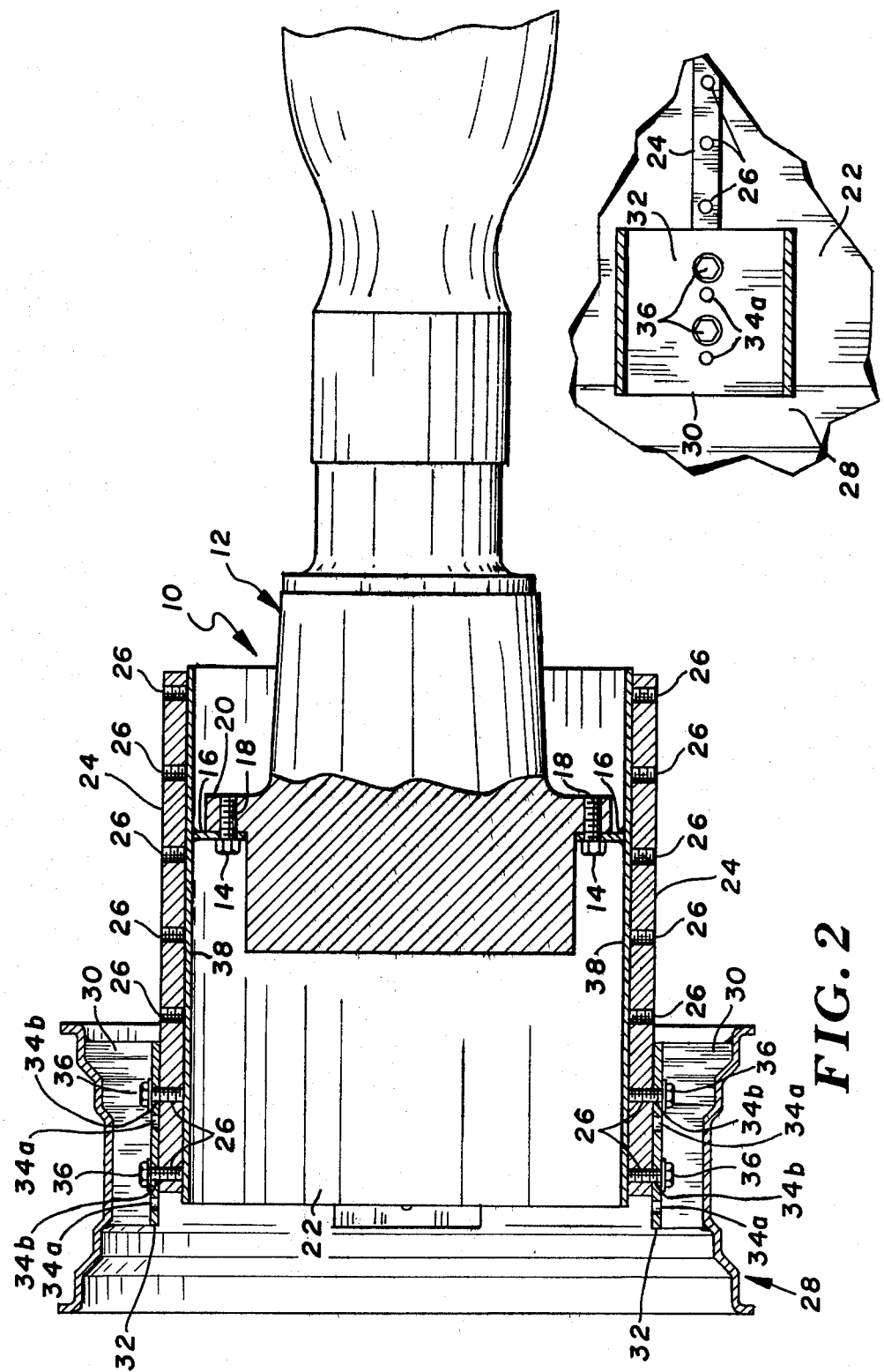

WHEEL RIM MOUNTING DEVICE FOR VARIABLE WHEEL SPACING

BACKGROUND OF THE INVENTION

1. Field of the Invention

The wheel rim mounting device of the present invention relates to devices for adjusting wheel rims in the axial direction. In particular, the present invention relates to wheel rim mounting devices for variable wheel spacing that do not need specially constructed or modified wheel hubs.

2. Description of the Prior Art

It is desirable in connection with tractors and other off the road vehicles to be able to vary the spacing between the wheel rims. For example, in the case of a tractor, the wheel spacing or track should conform with the spacing between rows of crops. For this reason, it is necessary, especially with large wheels, to have the capability to axially adjust the spacing in order to conform to the spacing required for the particular job.

In the past, several arrangements and devices have been developed to provide the capability of being able to axially adjust the spacing between the wheel rims without physically taking the wheel rims off the wheel hubs. This is extremely desirable for large tractor wheel rims and tires. However, the past devices and arrangements have required that the wheel hub be specially constructed or modified to adjustably engage a wheel rim in the axial direction.

The Hutchings U.S. Pat. No. 2,467,482 shows such a device. A plurality of circumferentially spaced lugs are rigidly attached to the wheel hub and slidably engage a corresponding number of angle iron bars which are rigidly attached to the wheel rim. This arrangement requires that the wheel hub be modified by welding the lugs thereto.

The Allman U.S. Pat. No. 2,495,952 describes a device that employs a specially constructed radially ribbed wheel hub. The wheel rim is attached to a disc which has a hub engaging hole conforming to the radially ribbed hub and welded lugs that align with threaded apertures in the hub ribs. The wheel rim is held in place by bolts that secure the disc lugs to the hub. This type of arrangement has limited value since the tractor has to have specially constructed wheel hubs in order to use the invention of the Allman patent.

The Ginkel U.S. Pat. No. 2,432,407 shows another axially adjustable wheel rim but with a wheel hub specially constructed with outwardly extending portions to engage the wheel rim.

The Jaeger U.S. Pat No. 2,175,294 shows circumferentially spaced bars of angle iron used to secure a wheel rim by frictionally engaging each other. A cylinder directly secured to the spokes of the wheel hub has outwardly facing bolts that supply a force for the frictional engagement of the bars. The cylinder being directly secured to the spokes of the wheel hub becomes an integral part thereof and limits the invention of the Jaeger patent to wheel hubs so constructed.

The Kanemoto U.S. Pat. No. 2,727,789 shows an arrangement of slidably engaging slotted angle irons with one angle iron being rigidly secured to the rim and another rigidly secured to the wheel. This arrangement limits the invention of the Kanemoto patent to wheel hubs modified in this manner.

SUMMARY OF THE INVENTION

A wheel rim mounting device provides for axial adjustment of the wheel rim in combination with a conventional wheel hub. The device includes a cylindrical sleeve attached to the wheel hub. The sleeve has a plurality of outwardly facing threaded apertures. The wheel rim has a plurality of brackets rigidly attached to its inner surface, each bracket having at least one hole alignable with the threaded apertures of the cylindrical sleeve.

The brackets are spaced circumferentially so that when the wheel rim is mounted, the brackets and the cylindrical sleeve engage each other. To guide the slidable engagement of the brackets and the bars, a guide is rigidly attached to the slidably engaging surface of one of the brackets.

Threaded screw fasteners are used to engage the apertures of the brackets and the threaded apertures of the bars which are aligned to secure the wheel rim to the desired axial position. When the threaded screw fasteners are engaging, the engaging surface of the bracket will be forced to come in direct contact with the sleeve. When the threaded screw fasteners are disengaged, the engaging surface of the bracket will spring back to its normal position, slightly spaced from the sleeve, in order to facilitate axial adjustment of the wheel rim.

The brackets preferably have two pairs of displaced holes, the holes of each pair being spaced the distance between any pair of threaded apertures of the corresponding bars so that by selectively passing the screw fasteners through either pair of holes into threaded apertures of the corresponding bar, the position of the wheel can be shifted by the displacement from each other of the two pairs of holes.

The cylindrical sleeve is long enough to accommodate two or more rims. Thus, two or more wheel rims can be mounted on a wheel that has not been specially modified or constructed to accommodate two wheel rims.

A second set of bars may be used to obtain wider spacings between opposing wheel rims on the vehicle. The bars have a plurality of apertures. One end of each bar has apertures which are aligned with the apertures of the sleeve. The apertures on the other end of the bars are aligned with the apertures on the brackets. Threaded screw fasteners are used to secure each end of the second set of bars to the sleeve and the brackets.

BRIEF DESCRIPTION OF THE DRAWINGS

FIG. 1 is an end view of the wheel rim mounting device for variable wheel spacing of the present invention;

FIG. 2 is a cross-sectional view taken along the line 2—2 in FIG. 1;

FIG. 3 is a fragmentary view taken along the line 3—3 in FIG. 1;

FIG. 4 is an end view of the present invention with the screw threaded fasteners removed; and FIG. 5 is a fragmentary cross-sectional view of the extension bar of the present invention.

DESCRIPTION OF THE PREFERRED EMBODIMENT

The wheel rim mounting device for variable wheel spacing of the present invention is generally shown at 10 attached to a conventional wheel hub 12 as best seen in FIGS. 1 and 2. The device includes a cylindrical sleeve 22 having a flange 16 permanently attached on an inside surface, preferably by welding. Flange 16 is located at any preferred longitudinal position along the inside of sleeve 22. One factor used to determine the location of the flange 16 is the location of the flange portion 20 of the wheel hub. It is always desirable that in one position of the rim on the sleeve, the wheel spacing will be a conventional wheel spacing. The sleeve 22 is secured to the wheel hub 12 by fastening the flange 16 to the flange 20 of the hub by cap screws 14 extending through threaded apertures 18 in the flange 20.

On the outer surface of the cylindrical sleeve 22 are a plurality of circumferentially spaced bars 24 as best seen in FIG. 1. In the preferred embodiment, there are four bars 24, preferably welded longitudinally to the sleeve 22, parallel to the axis of the wheel hub 12. The bars 24 also have outwardly facing threaded apertures 26 as shown in FIG. 2.

The wheel rim, generally indicated at 28, has brackets 30 rigidly attached to the wheel rim's inner surface. The brackets are circumferentially spaced around the inner surface of the wheel rim 28 and correspond to the same spacing as the bars 24. In the preferred embodiment, there are four bars 24 and four brackets 30 equally spaced apart.

The preferred shape of the brackets 30 is U-shaped in which the two ends of the U-shaped bracket are preferably welded to the inner surface of the wheel rim 28. As will be evident from the drawing, each U shaped bracket has two end leg portions which are the portions welded to the wheel rim. The leg portions are joined by a base portion 32 constituting a bar engaging portion which slidably engages the bar 24. The U-shaped brackets 30 have two pairs of apertures 34a and 34b which straddle each other as shown in FIG. 2. The spacing between apertures 34a is the same as the spacing between two adjacent threaded apertures 26 of the bars 24. Similarly, the spacing between apertures 34b is the same as that between two adjacent apertures 26. The individual apertures 34a are, however, spaced a smaller distance from the corresponding apertures 34b. Cap screws 36 extend through either apertures 34a or 34b and threadedly engage a pair of apertures 26 securely holding the wheel rim onto the bars 24, and hence onto the hub. By selecting which pair of apertures 34a or 34b are used, it is possible to obtain a further adjustment of the spacing of the wheels, as will be described more fully.

It should be understood that the bars 24, while highly desirable, are not necessary to achieve the desired results of the present invention. The sleeve 22 could merely have a thicker wall wherein the threaded apertures 26 are located. For the purposes of economy and less weight, bars 24 are preferable to a thicker wall of sleeve 22.

The bar engaging portions 32 of the U-shaped brackets 30 are biased outwardly so that when the screw threaded fasteners 36 are disengaged from the threaded apertures 26 of the bars 24, the bar engaging or base portions 32 move outwardly to cause gaps 40 to exist between the engaging portions 32 of the brackets 30 and the bars 24, as best shown in FIG. 4. The gaps 40 between the engaging portions 32 and the bars 24 facilitate easier axial adjustment of the wheel rim 28.

A guide is located on the bracket 30 to assist in the axial alignment of the apertures 34 of the bracket 30 and the apertures 26 of the bars 24. In the preferred embodiment, the guide is a pair of parallel rods 42, each rod 42 being preferably welded to the bar engaging portion 32 on an opposing side of the bar 24. The rods 42 are spaced apart to allow the bar 24 to move in the axial direction and are large enough in diameter to engage the bar in the radial direction, thereby keeping the bar between the rods and in radial alignment. Preferably only one guide is needed per wheel rim as shown in FIGS. 1 and 4, but any number of guides may be employed.

The cylindrical sleeve 22 is preferably long enough to accommodate two or more adjacent wheel rims. The cylindrical sleeve 22 can therefore be attached to a conventional wheel hub providing it with the capacity for two wheel rims.

In use, the present invention allows the user to vary the axial position of a wheel rim and therefore, the spacing between the vehicle's tires. To adjust the space between the wheel rims, the cap screws 36 are disengaged from the apertures 26 and 34. When the cap screws are removed, the bar engaging portions 32 move, due to their resiliency, to the positions shown in FIG. 4 in which they are spaced from the bars 24 by gaps 40. The wheel rim 28 is now in a freely slidable engaging relationship with the bars 24 of the cylindrical sleeve 22. The wheel rim 28 is slid along the bar 24 until the desired spacing is reached and different apertures 26 are aligned with the apertures 34 of the bracket 30. Further, the guide rods 42 prevent the user from losing radial alignment of the apertures 34 and 26. To secure the wheel rim, the cap screws 36 are extended through apertures 34 and 46 and threadedly engaged with the apertures 26, and tightened until the bar engaging portions of the bracket 30 are again tightened against the bars 24.

As pointed out previously, further adjustment is possible by selecting whether the cap screws are inserted through apertures 34a or 34b of the brackets. As has been pointed out, the apertures 34a are spaced from apertures 34b by less than the spacing between any two adjacent threaded apertures 26. Thus, it is possible to get an additional adjustment of the position of the wheel rim 28 on the sleeve 22 that is not possible merely by selecting a different set of apertures 26. If further adjustment is desired, a slot can be employed in lieu of apertures 34a and 34b.

Extension bars 44 can be used in combination with the cylindrical sleeve 22 and the brackets 30 to further extend the spacing of the wheels of a vehicle, as shown in FIG. 5. The extension bars 44 have apertures 46 which are alignable with the threaded apertures 26 of the bars 24 of the cylindrical sleeve 22. Each extension bar also has threaded apertures 48 which are alignable with the apertures 34a or 34b of the bracket 30. Screw threaded fasteners such as cap screws 50 extend through apertures 34 and 46 and threadedly engage apertures 48 and 26, respectively, thereby rigidly connecting the wheel rim 28 to the cylindrical sleeve 22. Spacers 52 are desirable so that extension bars 44 are parallel to the axis of revolution of the wheel hub.

The arrangement of FIG. 5 provides for the full flexibility obtained with the arrangement of FIGS. 1 through 4. In other words, the cap screws 46 can be inserted through any pair of apertures 26. In addition, the rim 28 can be mounted in either of two positions with respect to the extension bars 44 by selecting whether the cap screws 50 are passed through apertures 34a or 34b. The arrangement of FIG. 5 has the advantage that very wide spacing of the wheels can be obtained.

CONCLUSION

It will be seen that there has been provided an arrangement in which it is possible to have a very wide range of adjustment of a wheel rim with respect to an axle. Furthermore, it is possible to readily employ dual rims where desired.

While the present invention has been described with reference to certain preferred embodiments, it will be obvious that changes can be made in form and detail without departing from the spirit and scope of the invention.

What is claimed is:

1. A wheel rim and a mounting device therefore for use with a conventional wheel hub attached to an axle of an off-the-road vehicle for making possible variations in the spacing between wheel rims, said rim and mounting device comprising:
   a cylindrical sleeve with an outer surface and an inner surface for attachment to a conventional wheel hub, said cylindrical sleeve having a plurality of rows of outwardly facing threaded apertures, the rows of apertures being positioned in a longitudinal axial direction;
   a wheel rim with an inner surface;
   a plurality of bracket means circumferentially spaced and rigidly attached to the inner surface of the wheel rim, each of said bracket means having an aperture therethrough alignable with a corresponding threaded aperture of the cylindrical sleeve,
   each of said bracket means being in the form of a U-shaped bracket having two end leg portions rigidly attached to the inner surface of the wheel rim and a base portion through which the aperture extends, the dimensions of said leg members of said bracket means being such that when no tension is exerted upon the base portions, the base portions of opposed brackets are spaced apart greater than the distance between adjacent points of the cylindrical sleeve so that the wheel rim will freely slide axially on the sleeve when the base portions are not under tension; and
   a screw threaded fastening means extending through the bracket means and threadedly engaging at least one of the threaded apertures of the cylindrical sleeve for securing the wheel rim to the cylindrical sleeve, the U-shaped brackets being sufficiently flexible that when said fastening means are tightened the base portions are drawn into engagement with the sleeve for firmly securing the rim to the sleeve.

2. The device of claim 1 wherein the rows of apertures of the cylindrical sleeve are located in a plurality of bars circumferentially spaced and rigidly attached to the outer surface of the cylindrical sleeve.

3. The device of claim 2 further comprising:
   a guide means rigidly secured to the bracket means to guide the wheel rim adjustment in a longitudinal axial direction.

4. The device of claim 3 wherein the guide means is a pair of rod members rigidly secured to the bracket means and sufficiently spaced apart to allow passage of one of said bars between the rod members in the axial direction.

5. The device of claim 4 wherein the pair of rod members is rigidly secured to only one bracket means.

6. The device of claim 4 wherein the pair of rod members are welded to the bracket means.

7. The device of claim 2 wherein there are four circumferentially spaced bars and bracket means.

8. The device of claim 1 wherein each bracket means has a plurality of pairs of apertures, and a pair of which are alignable with two threaded apertures of the cylindrical sleeve, said pairs being spaced from each other by a different distance than that between two threaded apertures of the sleeve.

9. The device of claim 1 wherein the screw threaded fastening means is a cap screw.

10. The device of claim 1 wherein the cylindrical sleeve is designed to be rigidly attached to the wheel hub by an inner flange rigidly attached to the inner surface of the cylindrical sleeve and which is secured to an outer flange portion of the wheel hub.

11. The device of claim 1 wherein the cylindrical sleeve is sufficient in length to accommodate two or more wheel rims.

12. A wheel rim and a mounting device therefor for use with a conventional wheel hub attached to an axle of an off-the-road vehicle for making possible variations in the spacing between wheel rims, said rim and mounting device comprising:
   a cylindrical sleeve with an outer surface and an inner surface for attachment to a conventional wheel hub, said cylindrical sleeve having a plurality of bars circumferentially spaced and rigidly attached to the outer surface thereof, said bars each having a row of outwardly facing threaded apertures therein extending in a longitudinal direction;
   a wheel rim with an inner surface;
   a plurality of bracket means circumferentially spaced and rigidly attached to the inner surface of the wheel rim, each of said bracket means having an aperture therethrough alignable with a corresponding threaded aperture of the cylindrical sleeve;
   a screw threaded fastening means extending through the bracket means and threadedly engaging at least one of the threaded apertures of the cylindrical sleeve for securing the wheel rim to the cylindrical sleeve, said wheel rim being adjustable axially and slidably engaging the cylindrical sleeve when the fastening means are released; and
   a plurality of rigid extension bars circumferentially spaced with outwardly threaded apertures alignable with the apertures of the bars of the cylindrical sleeve and the bracket means whereby when the aligned apertures are engaged by screw threaded fastening means the extension bars extend the position of the wheel rim axially away from the wheel hub.

* * * * *